United States Patent [19]

Patterson

[11] Patent Number: 4,730,844
[45] Date of Patent: Mar. 15, 1988

[54] VEHICLE SEAT BELT SYSTEM

[75] Inventor: Michael Patterson, Carlisle, England

[73] Assignee: ASE (UK) Limited, Carlisle, England

[21] Appl. No.: 863,829

[22] Filed: May 12, 1986

[30] Foreign Application Priority Data

May 10, 1985 [GB] United Kingdom ................. 8511902

[51] Int. Cl.⁴ ............................................ B60R 21/10
[52] U.S. Cl. .................... 280/804; 280/802; 280/806
[58] Field of Search ............... 280/801, 802, 803, 804, 280/805, 806; 180/268, 282; 318/467, 434

[56] References Cited

U.S. PATENT DOCUMENTS

| 3,822,760 | 7/1974 | Lindblad | 280/804 |
| 3,854,749 | 12/1974 | Fieni | 279/469 |
| 4,061,365 | 12/1967 | Nagano et al. | 280/745 |
| 4,281,853 | 8/1981 | LeVeux | 280/804 |
| 4,321,979 | 3/1982 | Kuroyama | 280/804 |
| 4,388,575 | 6/1983 | Lungu | 318/475 |
| 4,410,061 | 10/1983 | Terabayashi | 180/268 |
| 4,508,362 | 4/1985 | Higuchi | 280/804 |
| 4,561,677 | 12/1985 | Kawai | 280/804 |

FOREIGN PATENT DOCUMENTS 3007059 9/1981 Fed. Rep. of Germany.

Primary Examiner—Richard A. Bertsch
Attorney, Agent, or Firm—Young & Thompson

[57] ABSTRACT

A passive vehicle seat belt system includes measures to prevent overheating of the drive motor and obstruction of system operation. Drive motor excess current demand is sensed to effect motor de-energization and/or disabling of latching means of a retractor included in the system and/or operation of an indicator light. The indicator light can prompt manual motor de-energization. Disabling of retractor latching means can be effected by a belt movement command signal. Retractors with means for signalling operation of latching means, with solenoid means for disabling latching means, and with means for indicating when a predetermined belt length has been received therein, are described.

26 Claims, 13 Drawing Figures

U.S. Patent    Mar. 15, 1988    Sheet 3 of 3    4,730,844
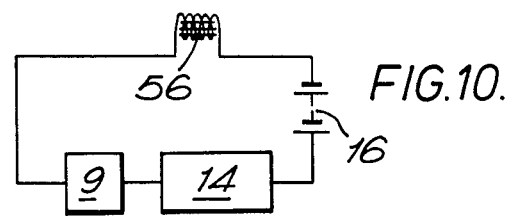
FIG. 10.
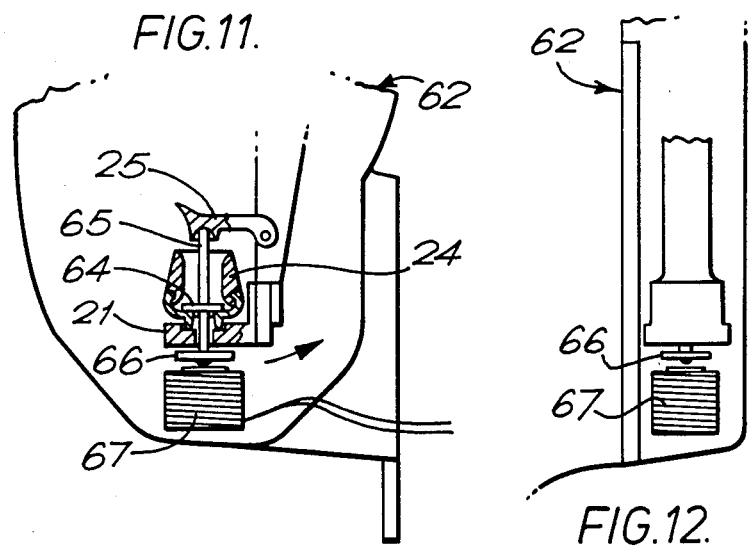
FIG. 11.
FIG. 12.
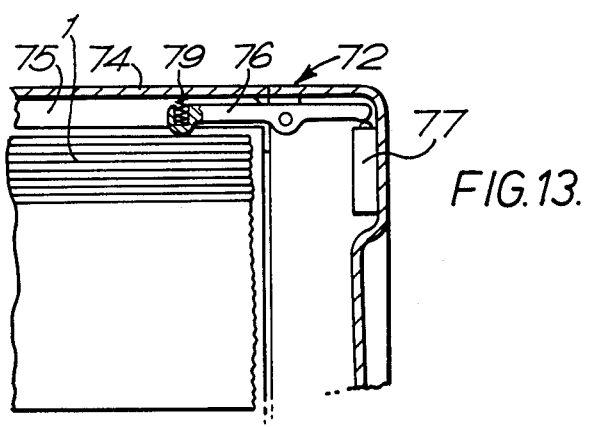
FIG. 13.

VEHICLE SEAT BELT SYSTEM

FIELD OF THE INVENTION

The invention relates to vehicle seat belt systems and retractors, with particular reference to passive seat belt systems and to retractors for use therein.

BACKGROUND OF THE INVENTION

Passive seat belt systems commonly include a seat belt which is moved between an operative and an inoperative position by means of an electric motor drive in response for example to the closing and opening of an adjacent vehicle door. One end of the belt may thus be fastened to a carriage which is reversibly moved along a track by the electric motor. The belt may be withdrawn from a retractor against a spring bias and such retractors commonly incorporate a latching mechanism which prevents belt withdrawal when a predetermined condition is sensed, typically one or both of belt or vehicle, and thus retractor, acceleration in excess of certain limits. Many vehicle acceleration sansitive latching mechanisms are capable of latching when the vehicle is parked on a steep hill and this condition prevents movement of the belt of a passive system where this movement requires belt withdrawal from the retractor, with possible consequential damage by overheating to the electric motor which has to be energized to effect this movement. Such damage could of course occur in any kind of passive system where a drive motor was unable to move the seat belt, for any reason.

It is therefore an object of the present invention to provide means for avoiding damage to the drive motor of a passive seat belt system in the event of an obstruction to belt movement.

It is also an object of the invention to provide means responsive to drive motor overload to initiate protective procedures for the system.

It is a further object of the invention to provide means for proper functioning of a passive seat belt system including a retractor regardless of undesired latching thereof against belt withdrawal.

It is also an object of the invention to provide a seat belt retractor capable of signalling whether or not it is latched against belt withdrawal.

It is also an object of the invention to provide a seat belt retractor having a latch mechanism capable of being disabled in response to an electrical signal.

It is also an object of the invention to provide a seat belt retractor capable of signalling the quantity of the seat belt retained therein or withdrawn therefrom.

SUMMARY OF THE INVENTION

The invention thus provides a passive seat belt system in which the belt is moved between operative and inoperative positions by energization of an electric motor, in which means is provided to initiate protective measures in response to motor experience consequential upon obstruction of the belt. The protective measures can comprise de-energization of the motor and/or the inhibition and/or disabling of a retractor latching mechanism where the system includes a retractor, preferably with an indication, for example, a visible indication, of the situation to the user of the system, and/or the vehicle operator. Alternatively, the indication alone can be given, it being left to the user or operator to act on the motor energization and/or a retractor latching mechanism. The motor experience senses can be an excess current demand on the part of the motor such as would occur from continued energization of the motor whilst belt movement was for any reason obstructed, so that the motor can be protected against overheating.

The invention also provides a passive seat belt system in which the belt is drawn from a retractor during movement of the belt between operative and inoperative positions thereof, the retractor incorporating latch means operative to latch the retractor against belt withdrawal in response to a first predetermined condition, and in which means is provided to disable and/or inhibit such operation of the latch means in response to a second predetermined condition requiring the movement of the system.

The second predetermined condition conveniently comprises the generation of a command signal for effecting the belt movement, for example, the energization of an electric drive motor for causing belt movement in the direction requiring belt withdrawal from the retractor, or in either direction.

The invention also provides a seat belt retractor capable of use in a vehicle seat belt system of the invention, the retractor comprising a lock cup retatable about the axis of a retractor spool to effect lauching in response to the sensing of a predetermined belt or retractor acceleration by acceleration sensitive means, together with electrical means arranged to change condition in response to movement of the lock cup. The electrical means can comprise a micro-switch positioned to be engaged and disengaged by the lock cup.

The invention also provides a seat belt retractor capable of use in a vehicle seat belt system of the invention, the retractor having latch means operative in response to a predetermined condition to prevent belt withdrawal, the latch means comprising a pivotably mounted double armed lever movable by an acceleration sensitive inertia device to engage a wheel rotatable with a spring-biassed spool on which the belt is wound, and electrical means operable to disable the latch means and/or inhibit its operation, in the form of a solenoid acting on one arm of the lever. Alternatively, where the inertia device comprises a pin movable generally axially upwardly as by a tilting weight to operate the lever, which can be a single armed lever, the pin can carry an armature at its lower end, on which the solenoid acts when energized to restore the pin and weight to the unlatched position.

The invention also provides a seat belt retractor capable of use in a vehicle seat belt system of the invention, the retractor having a spring biassed spool on which and from which the seat belt can be wound and unwound, and electrical means arranged to change condition in response to a predetermined change in the length of belt wound on the spool. The electrical means can comprise a switch operable by a lever of which one end is biassed to engage the outer layer of belt on the spool and of which the other end engages the switch. The retractor thus includes a belt capacity sensor the output of which can be employed for indicating and/or control purposes, for example to indicate that a seat belt has not come into or out of use, as by failure of a passive system or by disconnection of one of the ends of the belt.

The invention is further explained below, by way of illustration, with reference to the accompanying schematic drawings, in which:

FIG. 10 is a schematic diagram of a second alternative circuit for use in the circuit of FIG. 1, with the retractor of FIGS. 8 and 9;

FIGS. 11 and 12 are like views of a fourth retractor for use in the system of FIG. 1 in place of the retractor of FIGS. 8 and 9; and FIG. 13 is a fragmentary view of the interior of a fifth retractor in accordance with the invention.

Figure 1:
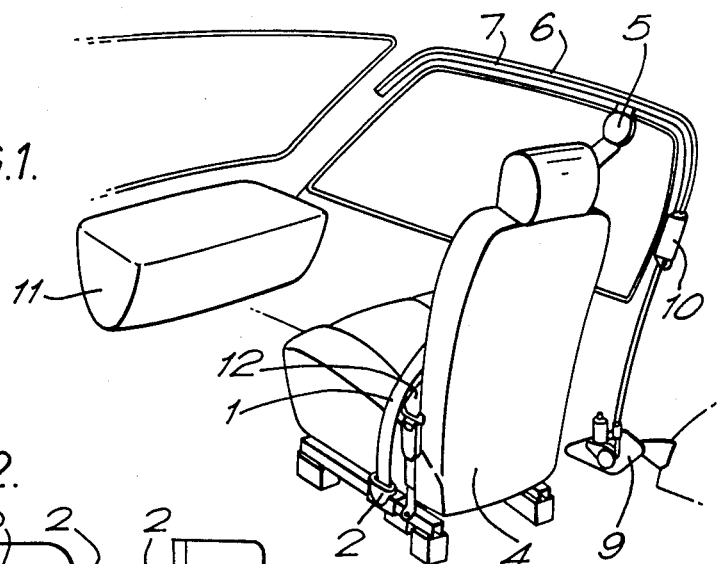
FIG. 1 is a partial perspective view of a road vehicle interior, showing a vehicle seat with which there is associated a passive seat belt system in accordance with the invention.

As shown in FIG. 1, a road vehicle includes a passive seat belt system in which a shoulder belt 1 has its lower end received in a retractor 2 secured to the vehicle frame on the inboard side of a vehicle seat 4, the upper end being connected to a carriage 5 movable along a track 6 extending in the fore and aft direction of the vehicle above a window adjacent the seat. The carriage is movable along the track 6 by a cable 7 driven by a reversible electric motor 9. At its rearward end, the track 6 has a portion extending downwardly to a locking mechanism 10 with which the carriage 5 engages in the rearward, operative, position of the belt 1. A knee bolster 11 is located in front of the seat and/or an active lap 12 belt can be provided.

The electric motor 9 is controlled by control circuitry 14 including limit switches responsive to the arrival of the carriage 5 at respective ends of the track, and a switch responsive to the position of the vehicle door, for example, the courtesy light switch. Any suitable control circuitry can be employed, for example that shown in FIG. 1 of GB No. 1 388 382, the contents of which are incorporated herein by reference.

When the vehicle door is opened, the door and limit switches effect energisation of the motor 9 so that the carriage 5 is moved forwardly from its rear, operative, position, carrying with it the belt 1 to an inoperative position in which it does not impede entry to the seat 4. When the door is closed again, with the seat occupied, the switches energising the electric motor to rotate in the opposite direction and bring the carriage 5 back into engagement with the lock device 10, with the belt in the operative position to restrain the occupant.

It is to be understood that the passive seat belt system briefly described above is one only of a variety of such systems to which the present invention can be applied.

Figure 2:
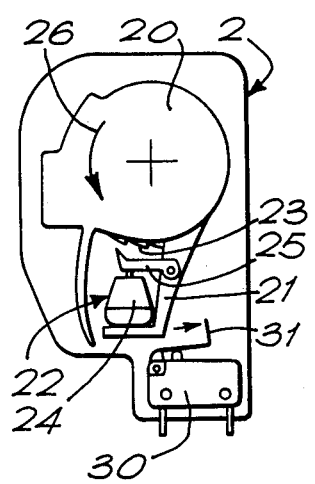
FIGS. 2 and 3 are respectively axial and partial front views of a retractor for use in the system of FIG. 1.
Figure 3:
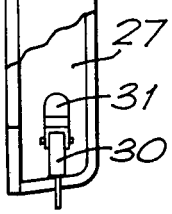

The retractor 2 shown in FIGS. 2 and 3 can correspond generally to that disclosed in Patent Application EP No. 0 092 407, the contents of which are incorporated herein by reference. The retractor has a frame rotatably mounting a spring biassed spool for accommodating the belt and a locking mechanism including a lock cup 20 with a support 21 for a vehicle sensor 22, that is, an inertial device responsive to retractor acceleration, and thus to vehicle acceleration. The sensor 22 comprises a weight 24 which tilts in response to a predetermined acceleration to pivot an arm 25 also mounld on the lock cup 20 to engage with its free end a toothed wheel 23 driven by the spool to thereby cause rotation of the lock cup in the direction of the arrow 26 to a latched position in which further rotation of the spool in the belt unwinding direction is prevented.

If the vehicle of FIG. 1 were to be parked on a steep hill, such that the vehicle sensor weight 24 tilts sufficiently, the retractor becomes locked against belt withdrawal. Opening of the vehicle door will operate the control circuit so as to move the carriage 5 forwardly along the track 6. With the system as so far described, this movement will be promptly checked, because it requires withdrawal from the retractor 2 of a certain length of the belt 1, and the retractor has become locked against belt withdrawal. The occupant of the seat 4 can consequently remove himself from the vehicle only with considerable difficulty, or by use of a manual override, if provided, to render the belt inoperative and the motor 9 will remain energised so as to overheat and perhaps burn itself out.

Figure 4:
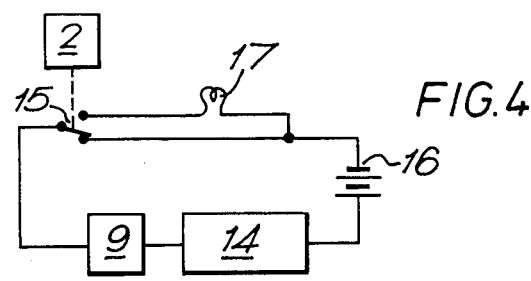
FIG. 4 is a schematic circuit diagram of the system of FIG. 1.

However, in accordance with the invention, the retractor 2 includes within its casing 27 a normally open microswitch 30 with an operating arm 31 located so as to be engaged by a portion of the lock cup 20 as this moves to the latching position. Closure of the microswitch 30 energises a relay to open a switch 15 in a circuit (FIG. 4) including a power source 16, the motor 9, and the control circuitry 14, so as to deenergise the motor 9. Operation of a microswitch 30 preferably does not take place immediately, but only after the motor 9 has driven the carriage 5 through a certain distance, so the user of the system is made aware that it has not failed completely, but is merely being blocked by latching of the retractor 2. This situation is preferably also signalled to the user independently, conveniently by a warning light 17 on the dashboard which is energized through the switch 15 on de-energization of the motor 9. The user can then apply a manual override means to release the system, or the situation of the vehicle can be adjusted so that the vehicle sensor 22 no longer causes latching.

Figure 5:
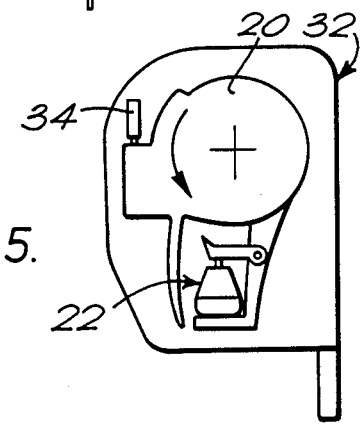
FIGS. 5 and 6 are like views of a second retractor for use in the system of FIG. 1.
Figure 6:
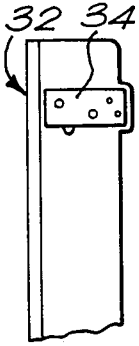

In place of the retractor 2 shown in FIGS. 2 and 3, the retractor 32 of FIGS. 5 and 6 can be employed. This can resemble the retractor 2, but a normally open microswitch 34 is here mounted in the cover 27 so as to be actuated by the lock cup 20 at the beginning of the movement into the latching position. The motor 9 is thus de-energised after a smaller amount of belt movement than with the retractor 2.

Whichever form of retractor is employed, the system provides protection for the motor 9 and an indication to the user as to why functioning of the system is blocked.

Figure 7:
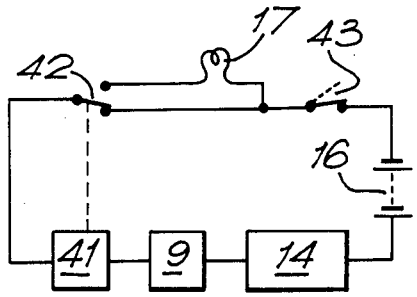
FIG. 7 is a schematic diagram of an alternative circuit for use in the system of FIG. 1.

FIG. 7 schematically shows a control circuit for a passive seat belt system embodying the invention which can be generally in accordance with that of FIG. 1 for example, and which can incorporate either the retractor 2 or the retractor 32, with or without the microswitch 30 and 34. The circuit of FIG. 7 incorporates the motor 9, the control circuitry 14 and the power source 16, and in addition a current sensor 41 arranged to sense the current requirements of the motor. The sensor 41 is operatively linked with a switch 42 which is normally closed to allow operation of the system but which is arranged to be opened by the sensor when this senses that the motor current requirement exceeds a predetermined level, corresponding to the level that prevails under the most adverse operating conditions, as will occur when the motor 9 encounters the resistance to belt movement imposed by the latched retractor. Thus again the motor 9 is protected. The circuit again can include indicating means to alert the user of the system to the position, in the form of the warning light 17 which is energised on de-energization of the motor 9.

In an alternative arrangement, the switch 42 is operated by the sensor 41 to energise the warning light 17 only, it being left to the user of the system to de-energise the motor 9 manually by means of a further switch such as the switch 43 of FIG. 7.

Figure 8:
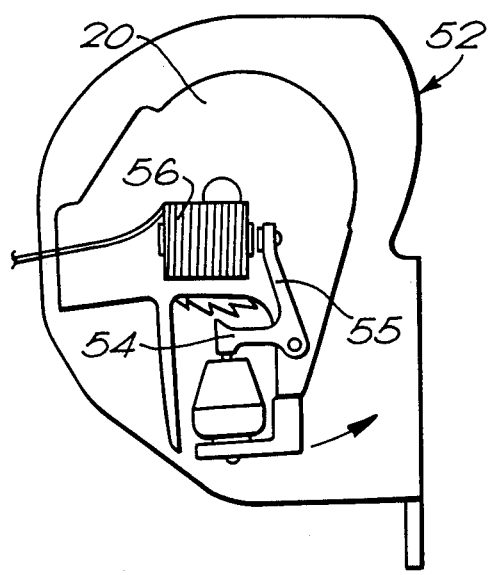
FIGS. 8 and 9 are views similar to those of FIGS. 2 and 3 of a third retractor for use in the system of FIG. 1.
Figure 9:
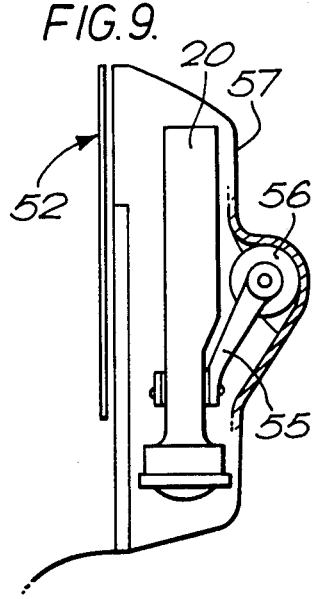

Also in accordance with the invention, a passive seat belt system such as that indicated in FIG. 1 can incorporate the retractor 52, of FIGS. 8 and 9. The retractor 52 generally corresponds to the retractor 2, but the arm 25 is replaced by one arm 54 of a two-arm lever, of which the free end of the other arm 55 constitutes or carries an armature co-operating with a normally de-energised solenoid coil 50 secured within the retractor casing 57.

As appears from FIG. 10, the solenoid coil 56 is connected into a circuit including the motor 9, the control circuitry 14 and the power source 16 so as to be energised simultaneously with the electric motor 9, at least when such energization is to cause carriage movement in the direction to withdraw belt from the retractor 52, that is, to the forward position in the system of FIG. 1. Energization of the solenoid coil 56 causes the lever to pivot in the counterclockwise direction (as shown in FIG. 8) so that the free end of the arm 54 cannot engage with the wheel 23, or is withdrawn from such engagement. The weight 24 is thus held in or returned to its untilted position and the vehicle sensor 22 rendered ineffective. The arm 55 is so arranged that the balance and sensitivity of the arm 54 is the same as that of the arm 25.

The arrangement of FIGS. 8 and 9 necessarily involves an increase in the axial dimension of the retractor as appears from FIG. 9, and this can be avoided by use in place of the retractor 52, of the retractor 62 shown in FIGS. 11 and 12. This again generally corresponds to the retractor 2, but the weight 24 of the vehicle sensor 22 is hollow and rests on the support 21 by way of a circular rim. The weight acts by way of internal surfaces on a flange 64 carried by an upright central pin 65, the free upper end of which is received in a downwardly facing pocket at the outer end of the arm 25. When the weight 14 tilts under its own inertia, or because the retractor is tilted, the internal surfaces of the weight cause upward movement of the pin 65 and thus an upward pivoting of the arm 25 to engage the wheel 23.

In the retractor 62 the lower end of the pin 65 protrudes through an aperture in the support 21 and carries an armature 66 co-operable with a solenoid coil 67, which is connected into the control circuitry in the same way as the coil 56. Energisation of the coil 67 thus acts on the armature 66 to hold the pin 65 in, or to draw it downwardly to, the position of FIG. 8, in which the weight 24 is in its normal upright position, with the arm 25 spaced from the teeth of the wheel 23.

Instead of being energised automatically on energisation of the motor 9, the solenoid coil 56 or 67 can be energised conditionally, for example, by closure of a switch controlled like the switch 42 by a sensor such as the current sensor 41 of FIG. 7.

FIG. 13 illustrates schematically a retractor 72 incorporating switch means for sensing when a predetermined length of the belt 1 has been wound upon its spool. The retractor 72 can correspond generally to the retractors 2, 32, 52 or 62, but the retractor casing 74 incorporates a slot or elongate recess 75 extending parallel to the spool axis and pivotally mounting therein a lever 76 preferably by means of integrally moulded pivot pins. One end of the lever 76 can operate a microswitch 77 mounted in the casing 74, and the other end is biassed by a spring 79 to be engaged by the outer layer of the belt 2 when a predetermined length of the belt has been wound onto the spool.

When the belt 1 is in its forward, inoperative position, sufficient of the belt is withdrawn from the retractor for the lever 76 to be out of contact with the belt. The microswitch 77 will then assume a first condition. The belt 1 is rewound onto the spool as the carriage 5 moves rearwardly along the track 6, and eventually the lever 76 is engaged by the belt and pivoted to change the condition of the microswitch. The signal obtained from the microswitch 77 can thus be used to indicate whether or not the belt 1 has been brought into use, as by way of an indicating device such as the light 17. The portions of the casing 74 adjacent the slot 75 are engageable by the belt and provide a limit for the length of the belt webbing that can be received on the spool.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A passive vehicle seat belt system comprising:
    a seat belt movable between an out-of-use position and an in-use position,
    a retractor from which said seat belt can be withdrawn against a retractive bias,
    latch means adapted to be enabled to latch said retractor against belt withdrawal in response to a first, predetermined condition,
    an electric drive motor for moving said seat belt between said out-of-use and in-use positions,
    circuit means for controlling energization of said drive motor to effect said belt movements in response to command signals generated in response to second predetermined conditions, and
    disabling means for disabling said latch means from latching said retractor against belt withdrawal in response to a command signal for effecting belt movement requiring belt withdrawal from said retractor.

2. The passive seat belt system of claim 1 further comprising means responsive to obstruction of belt movement to effect de-energization of said drive motor.

3. The passive seat belt system of claim 2 further comprising indicator means, and wherein said responsive means is adapted to energize said indicator means on de-energization of said drive motor.

4. The passive seat belt system of claim 1 further comprising means responsive to said enabling of said latch means to effect de-energization of said drive motor.

5. The passive seat belt system of claim 4 further comprising indicator means and wherein said responsive means is adapted to energize said indicator means on de-energization of said motor.

6. The passive seat belt system of claim 1 further comprising indicator means, means responsive to obstruction of belt movement to energize said indicator means, and means for manually de-energizing said drive motor.

7. A seat belt retractor for use in a vehicle seat belt system, said retractor comprising
a frame,
a spool journalled on said frame for releasably receiving the seat belt,
a bias spring biassing said spool to wind the seat belt on said spool, and
an electrical means adapted to change condition in response to a predetermined change in the length of belt wound on said spool.

8. The retractor of claim 7 wherein said electrical means comprises a switch, a lever having a first end operably engageable with said switch and a second end, and means biassing said lever to engage said second end thereof with such of said seat belt which is wound upon said spool.

9. A seat belt retractor for use in a vehicle seat belt system, said retractor comprising
a frame,
a spool journalled on said frame for releasably receiving the seat belt,
a bias spring biassing said spool to wind the seat belt on said spool,
a ratchet wheel secured to said spool to rotate therewith,
a pawl pivotably mounted on said frame for movement from an unlatching position to a latching position of engagement with said ratchet wheel to thereby prevent unwinding of said belt from said spool,
a member mounted on said frame for rotation from an inoperative position to an operative position to thereby cause said pawl to engage said ratchet wheel,
inertial acceleration sensing means operable in response to a predetermined acceleration condition to link said member to said spool whereby spool rotation effects said rotation of said member, and
an electrical element adapted to change condition in response to said movement of said member to thereby signal the position of said pawl.

10. The retractor of claim 9 wherein said electrical element comprises a switch engageable by said member.

11. The retractor of claim 10 wherein said inertial acceleration sensing means comprises a weight movable in response to a predetermined acceleration of said retractor and wherein said member has a portion mounting said weight, said switch being engageable by said portion.

12. A seat belt retractor for use in a vehicle seat belt system, said retractor comprising a frame, a spool journalled on said frame for releasably receiving the seat belt, a bias spring biassing said spool to wind the seat belt on said spool, a latch mechanism responsive to a predetermined acceleration of said retractor to latch said spool against rotation to unwind said belt, and disabling means for disabling said latch mechanism from so latching said spool, wherein said latch mechanism comprises:
an inertial weight,
means mounting said weight for movement in response to said predetermined acceleration,
a ratchet wheel rotatable with said spool,
a lever having a first arm,
means pivotably mounting said lever for movement from a rest position to engage said first arm with said ratchet wheel in response to said movement of said weight, and wherein said disabling means comprises:
a solenoid coil
a second arm of said lever adapted to function as an armature for said solenoid coil, whereby said lever occupies said rest position during energization of said coil.

13. The retractor of claim 12 wherein said solenoid coil is located with the axis thereof substantially at right angles to the axis of said spool.

14. A seat belt retrator for use in a vehicle seat belt system, said retractor comprising a frame, a spool journalled on said frame for releasably receiving the seat belt, a bias spring biassing said spool to wind the seat belt on said spool, a latch mechanism responsive to a predetermined acceleration of said retractor to latch said spool against rotation to unwind said belt, and disabling means for disabling said latch mechanism from so latching said spool, wherein said latch mechanism comprises:
a hollow inertial weight,
a support supporting said weight for toppling movement thereon in response to said predetermined acceleration, and
an elongate output member received within said weight and movable thereby from a rest position to effect said latching in response to said toppling of said weight, and wherein said disabling means comprises:
a solenoid coil, means mounting said solenoid coil below said support with the solenoid coil axis substantially aligned with output member in the rest position thereof,
an aperture in said support,
an extension portion of said output member extending through said aperture towards said solenoid coil, and
an armature carried by said output member extension portion for co-operation with said solenoid coil whereby said output member occupies said rest position thereof during energization of said solenoid coil.

15. A passive vehicle seat belt system comprising:
a seat belt,
a retractor from which said seat belt extends,
biassing means in said retractor opposing withdrawal of said belt therefrom,
latch means in said retractor responsive to a predetermined acceleration condition to prevent withdrawal of said belt from said retractor,
a drive motor operable to move said seat belt between in-use and out-of-use positions thereof,
a sensor adapted to provide an output in response to excess current demand by said drive motor due to obstruction to said movement of said seat belt, and
means responsive to said sensor output to deenergize said motor to thereby prevent overheating thereof.

16. The system of claim 15 further comprising indicator means responsive to said sensor output to indicate said excess current demand and thus the existence of said obstruction.

17. The system of claim 15 further comprising latch means in said retractor operative to prevent said belt withdrawal in response to a predetermined condition, and disabling means responsive to said sensor output to disable said latch means from preventing said belt withdrawal.

18. A passive vehicle seat belt system comprising:
a seat belt movable between an out-of-use position and an in-use position,
an electric drive motor for moving said seat belt between said out-of-use and in-use positions,
circuit means for controlling energization of said drive motor to effect said belt movements in response to predetermined conditions,
a sensor adapted to provide an output on the sensing thereby of an effect on said drive motor due to obstruction to seat belt movement,
indicator means responsive to said sensor output to indicate said obstruction of said seat belt movement, and
means manually operable to de-energize said drive motor to thereby prevent overheating thereof.

19. The system of claim 18 wherein said sensor is adapted to provide said output in response to an excess current demand by said drive motor.

20. The system of claim 18 further comprising a retractor from which said seat belt is withdrawn during movement thereof to the in-use position, latch means in said retractor operative to prevent said belt withdrawal in response to a predetermined condition, and disabling means responsive to said sensor output to disable said latch means from preventing said belt withdrawal.

21. A passive vehicle seat belt system comprising:
a seat belt,
a retractor from which said seat belt extends,
biassing means in said retractor opposing withdrawal of said belt therefrom,
latch means in said retractor responsive to a predetermined condition to prevent withdrawal of said belt from said retractor,
a drive motor operable to move said belt between in-use and out-of-use positions thereof,
a sensor adapted to provide an output in response to an effect on said drive motor of obstruction to said movement of said belt, and
disabling means responsive to said sensor output to disable said latch means from preventing withdrawal of said belt.

22. The system of claim 21 wherein said latch means comprises an inertial weight, means mounting said inertial weight for movement in response to a predetermined acceleration of said retractor, and a latch member movable by said movement of said inertial weight from an inoperative position to a latching position preventing withdrawal of said belt from said retractor, and wherein said disabling means comprises a solenoid responsive to said sensor output to co-act with said latch member, whereby said latch member is held in said inoperative position thereof.

23. The system of claim 21 wherein said latch means comprises an inertial member movable in response to said predetermined acceleration condition, and a latch mechanism movable by said inertial member to prevent said belt withdrawal, and wherein said disabling means comprises electromagnetic means adapted to act on said latch mechanism.

24. The system of claim 21 wherein said latch means comprises an inertial weight having an aperture extending therethrough, means mounting said inertial weight for movement in response to a predetermined acceleration of said retractor, an actuator pin extending through said aperture in said inertial weight and movable thereby from a rest position in response to said movement of said inertial weight to prevent withdrawal of said belt from said retractor, and wherein said disabling means comprises a solenoid responsive to said sensor output to act on said actuator pin to thereby hold said actuator pin in said rest position thereof.

25. The system of claim 21 further comprising indicator means, and means energizing said indicator means in response to said sensor output.

26. A vehicle safety system comprising:
a seat belt,
a retractor device, said retractor device being capable of receiving therein a variable length of said seat belt, and
sensing means responsive to the length of said belt received in said retractor device and having first and second electrical conditions when said received length is respectively less than and greater than a predetermined length, and indicator means responsive to said sensing means condition to indicate whether said received length is less than or greater than said predetermined length.

* * * * *